US008005032B2

(12) United States Patent
Wang et al.

(10) Patent No.: US 8,005,032 B2
(45) Date of Patent: Aug. 23, 2011

(54) MAINTAINING DELIVERY TRAFFIC INDICATION MESSAGE (DTIM) PERIODS ON A PER-WIRELESS CLIENT DEVICE BASIS (75) Inventors: James Wang, Richmond Hill (CA); Tom Nagy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 552 days.

(21) Appl. No.: 11/041,124

(22) Filed: Jan. 21, 2005

(65) Prior Publication Data

US 2006/0187864 A1 Aug. 24, 2006

(51) Int. Cl.
*G04C 17/00* (2006.01)
(52) U.S. Cl. ........ 370/311; 370/474; 370/329; 370/487; 370/389; 370/338; 370/343; 455/418; 455/432.3; 455/574; 455/41.2; 455/296
(58) Field of Classification Search .................. 370/489, 370/331, 338, 328, 465, 311, 353, 343, 389, 370/329, 487, 312, 449, 474, 387; 375/130; 342/457; 455/458, 562.1, 456.1, 343.4, 519, 455/434, 513, 437, 418, 574, 512, 432, 41.2, 455/296, 41.1, 420, 432.3; 711/118, 138, 711/139, 144; 707/10, 103, 201, 203; 709/10, 709/103, 201, 203
See application file for complete search history.

(56) References Cited

U.S. PATENT DOCUMENTS

| 4,707,832 A * | 11/1987 | Glenn et al. ................. 370/489 |
| 5,991,287 A | 11/1999 | Diepstraten et al. |
| 6,067,297 A | 5/2000 | Beach et al. |
| 6,125,369 A * | 9/2000 | Wu et al. ....................... 707/201 |
| 6,192,230 B1 | 2/2001 | Bokhorst et al. |
| 6,370,121 B1 | 4/2002 | Hausman |
| 6,438,117 B1 * | 8/2002 | Grilli et al. .................... 370/331 |
| 6,507,349 B1 * | 1/2003 | Balassanian ................. 345/676 |
| 6,574,708 B2 * | 6/2003 | Hayter et al. ................. 711/118 |

(Continued)

FOREIGN PATENT DOCUMENTS

EP 0615364 9/1994

(Continued)

OTHER PUBLICATIONS

IEEE: "Part 11: Wireless LAN Medium Access Control (MAC) and Physical Layer (PHY) Specifications" ANSI/IEEE 802.11, 1999 Edition (R2003), Jun. 12, 2003, p. 1-8, 34-58, 98-137, 469-474, XP002332266.

(Continued)

*Primary Examiner* — Rafael Pérez-Gutiérrez
*Assistant Examiner* — Joseph Arevalo
(74) *Attorney, Agent, or Firm* — Integral Intellectual Property Inc.; Miriam Paton (57) ABSTRACT

An access point is to transmit delivery traffic indication messages at different periods of beacon frames for different wireless client devices associated with the access point. A client device may store an indication of a preferred period of beacon frames at which to listen to delivery traffic indication messages when in power save mode. The client device may adjust its preferred period according to predefined considerations, for example a charge level of a battery to power the client device and/or an expected usage model for the client device. A client device may negotiate its preferred period with the access point.

22 Claims, 4 Drawing Sheets

U.S. PATENT DOCUMENTS

| | | | |
|---|---|---|---|
| 6,633,924 B1* | 10/2003 | Wu et al. | 719/328 |
| 6,674,738 B1* | 1/2004 | Yildiz et al. | 370/338 |
| 6,697,415 B1* | 2/2004 | Mahany | 375/130 |
| 6,795,409 B1* | 9/2004 | Youssefmir et al. | 370/328 |
| 6,842,460 B1* | 1/2005 | Olkkonen et al. | 370/465 |
| 6,856,603 B1* | 2/2005 | Vollmer et al. | 370/311 |
| 6,917,804 B2 | 7/2005 | Takayama et al. | |
| 6,928,559 B1 | 8/2005 | Beard | |
| 6,934,870 B1 | 8/2005 | Amos | |
| 6,952,181 B2* | 10/2005 | Karr et al. | 342/457 |
| 6,982,968 B1* | 1/2006 | Barratt et al. | 370/328 |
| 6,999,769 B1* | 2/2006 | Henon | 455/445 |
| 7,043,259 B1* | 5/2006 | Trott | 455/458 |
| 7,062,294 B1* | 6/2006 | Rogard et al. | 455/562.1 |
| 7,120,138 B2* | 10/2006 | Soomro et al. | 370/343 |
| 7,123,253 B2* | 10/2006 | Stoll et al. | 345/418 |
| 7,126,926 B1* | 10/2006 | Bjorklund et al. | 370/328 |
| 7,126,945 B2* | 10/2006 | Beach | 370/389 |
| 7,142,535 B2* | 11/2006 | Kubler et al. | 370/353 |
| 7,167,713 B2* | 1/2007 | Anderson | 455/456.1 |
| 7,181,190 B2* | 2/2007 | Abhishek et al. | 455/343.4 |
| 7,206,594 B2* | 4/2007 | Shostak | 455/519 |
| 7,212,832 B2* | 5/2007 | Yokota | 455/513 |
| 7,224,970 B2* | 5/2007 | Smith et al. | 455/434 |
| 7,236,470 B1 | 6/2007 | Bims | |
| 7,236,787 B1* | 6/2007 | Tamura et al. | 455/437 |
| 7,274,929 B1* | 9/2007 | Banginwar | 455/418 |
| 7,340,615 B2 | 3/2008 | Krantz et al. | |
| 7,359,738 B2* | 4/2008 | Daniels et al. | 455/569.1 |
| 7,382,757 B2 | 6/2008 | LoGalbo et al. | |
| 7,420,942 B2* | 9/2008 | Wang | 370/329 |
| 7,433,669 B2 | 10/2008 | Rue | |
| 7,447,184 B1 | 11/2008 | Kharvandikar et al. | |
| 7,564,826 B2 | 7/2009 | Sherman | |
| 7,610,495 B2 | 10/2009 | Azadet et al. | |
| 2002/0025810 A1 | 2/2002 | Takayama et al. | |
| 2002/0063472 A1* | 5/2002 | Irvin | 307/10.1 |
| 2003/0157951 A1* | 8/2003 | Hasty, Jr. | 455/519 |
| 2003/0174645 A1 | 9/2003 | Paratainen et al. | |
| 2003/0217168 A1* | 11/2003 | Adachi et al. | 709/229 |
| 2003/0224840 A1* | 12/2003 | Frank et al. | 455/575.9 |
| 2004/0013128 A1 | 1/2004 | Moreton et al. | |
| 2004/0072559 A1 | 4/2004 | Kakumaru et al. | |
| 2004/0103282 A1 | 5/2004 | Meier et al. | |
| 2004/0125820 A1* | 7/2004 | Rios | 370/480 |
| 2004/0151149 A1 | 8/2004 | Song et al. | |
| 2004/0153676 A1 | 8/2004 | Krantz et al. | |
| 2004/0192325 A1 | 9/2004 | Beckes et al. | |
| 2004/0233936 A1 | 11/2004 | Cheng | |
| 2004/0235568 A1* | 11/2004 | Kim | 463/42 |
| 2004/0242258 A1* | 12/2004 | Kim | 455/522 |
| 2005/0002395 A1 | 1/2005 | Kondo | |
| 2005/0009512 A1* | 1/2005 | Rue | 455/420 |
| 2005/0020209 A1* | 1/2005 | Camp, Jr. | 455/41.2 |
| 2005/0054389 A1 | 3/2005 | Lee et al. | |
| 2005/0122936 A1 | 6/2005 | Son et al. | |
| 2005/0124294 A1* | 6/2005 | Wentink | 455/41.2 |
| 2005/0128988 A1 | 6/2005 | Simpson et al. | |
| 2005/0147073 A1 | 7/2005 | Hietalahti et al. | |
| 2005/0201341 A1 | 9/2005 | Griswold | |
| 2005/0226204 A1 | 10/2005 | Uehara | |
| 2005/0243737 A1 | 11/2005 | Dooley et al. | |
| 2005/0255892 A1* | 11/2005 | Wong et al. | 455/562.1 |
| 2005/0276237 A1* | 12/2005 | Segal et al. | 370/312 |
| 2006/0057964 A1 | 3/2006 | Roy et al. | |
| 2006/0098647 A1 | 5/2006 | Muehl et al. | |
| 2006/0142004 A1* | 6/2006 | He et al. | 455/434 |
| 2006/0174205 A1 | 8/2006 | Jung et al. | |
| 2006/0174206 A1 | 8/2006 | Jung et al. | |

FOREIGN PATENT DOCUMENTS

| | | |
|---|---|---|
| EP | 0907262 | 4/1999 |
| EP | 1237334 | 9/2002 |
| EP | 1311086 | 5/2003 |
| EP | 1564930 | 8/2005 |
| EP | 1670179 | 11/2007 |

OTHER PUBLICATIONS

IEEE: "Part 11: Wireless LAN Medium Access Control (MAC) and Physical Layer (PHY) specifications: Higher-Speed Physical Layer Extension in the 2.4GHz Band" IEEE STD 802.11B-1999, Sep. 16, 1999, p. 1, 89, XP002332267.

ETSI: "Broadband Radio Access Networks (BRAN); HIPERLAN Type 2; Data Link Control (DLC) Layer; Part 2: Radio Link Control (RLC) sublayer" ETSI TS 101 761-2 V1.3.1, Jan. 2002, p. 1-13, 92-97, XP002332268.

"Broadband Radio Access Networks (BRAN); HIPERLAN Type 2; Data Link Control (DLC) Layer; Part 2: Radio Link Control (RLC) sublayer", ETSI TS 101 761-2 V1.3.1, Jan. 2002, p. 1-13,92-97,XP002332268 chapter 5.2.6.

"Annex D/ ASN.1 encoding of the MAC and PHY MIB", Medium Access control (MAC) and Physical (PHY) Specifications ANSI/IEEE Std 802.11, 1999 Edition 1999.

Arevalo, Joseph , Final Office Action for U.S. Appl. No. 11/041,113, Feb. 2, 2009.

Rosken, Wilfried , Examination Report for EP 07124188.9, Nov. 26, 2008.

Arevalo, Joseph, Notice of Allowance for U.S. Appl. No. 11/041,113, May 13, 2009.

Li, Yanxin, Second Office Action for CN 200510022900.7, Oct. 16, 2009.

Zhang, Yu, Second Office Action for CN 200510048790.1, Oct. 16, 2009.

Bayaa, Hassan, First Office Action for CA 2,531,395, Jan. 12, 2010.

Li, Yanhui , Third Office Action for CN 200510022900.7, Feb. 5, 2010.

Aravelo, Joseph, First Office Action for U.S. Appl. No. 12/538,130, Sep. 22, 2010.

"Wireless LAN Medium Access Control (MAC) and Physical Layer (PHY) specifications: Higher-Speed Physical Layer Extension in the 2.4 GHz Band", IEEE Tsd 802.11b-1999 2000.

El-Hoiydi, A. et al., "Low power MAC Protocols for infrastructure Wireless sensor networks", abstract ; FIG. 3 col. 2, paragraphs 2-3 col. 5, paragraphs 1-2 col. 6 paragraph 7-col. 9 paragraph 1 Feb. 24, 2004.

IEEE, et al., "ISO/IEC 8802.11 (ANSI/IEEE 802.11) Chapter 11 pp. 123-137", 1999 , 123-137.

Jung, Eun-Sun et al., "An Energy Efficient MAC Protocol for Wireless LAN", 2002.

Arevalo, Joseph Second Office Action for U.S. Appl. No. 12/538,130, Mar. 21, 2011.

First Examination Report for EP 05108981.1, Nov. 25, 2005.

Arevalo, Joseph , Advisory Action for U.S. Appl. No. 11/041,113, May 21, 2008.

Arevalo, Joseph , Final Office Action for U.S. Appl. No. 11/041,113, Mar. 5, 2008.

Arevalo, Joseph , First Office Action for U.S. Appl. No. 11/041,113, Jul. 26, 2007.

Arevalo, Joseph , Second Office Action for U.S. Appl. No. 11/041,113, Jul. 11, 2008.

Choi, Nakjung et al., "Unicast-Friendly Multicast in IEEE 802.11 Wireless LANs", Nakjung Choi, Jiho Ryu, Yongho Seok, Yanghee Choi, and Taekyoung Kwon, "Unicast-Friendy Multicast in IEEE 802.11 Wireless LANs," IEEE CCNC 2006, Las Vegas, USA, Jan. 2006.

Isopescu, C , Exam Report for EP 04106427, Aug. 28, 2006.

Isopescu, C , "EESR", Extended European Search Report for EP 04106427, May 25, 2005.

Matar, G. , First Office Action for CA 2528376, Jun. 18, 2008.

Mian, Ali , First Office Action for CA 2531384, Jun. 13, 2008.

Muller, N , Examination Report for EP 05108981.1, Aug. 25, 2006.

Rosken, W. , Examination Report for EP 05100367.1 Oct. 4, 2006.

Rosken, W. , "EESR", Extended European Search Report for EP 05100367.1, Jul. 5, 2005.

Rosken, W. , "EESR", Extended European Search Report for EP07124188.9, Feb. 19, 2008.

Santande, M. , Second Examination Report for EP 05108981.1, Apr. 4, 2006.

Santande, M., "EESR", Extended European Search Report for EP 05100368.9, Aug. 22, 2005.

Santande, M., "Search Report", European Search Report for EP 05108981.1, Nov. 4, 2005.

Sefcheck, Gregory B., Notice of Allowance for U.S. Appl. No. 11/008,023, May 7, 2008.

Sefcheck, Gregory B., First Office Action for U.S. Appl. No. 11/008,023, Sep. 14, 2007.

Yanxin, Li, First Office Action with translation for CN 2005100229007, Jul. 20, 2007.

Zhang, Yu, First Office Action with translation for CN 2005100487901, Jan. 4, 2008.

Zhang, Yu, First Office Action with translation for CN 2005101381232, Jan. 4, 2008.

"Broadband Radio Access Networks (BRAN); HIPERLAN Type 2; Data Link Control (DLC) Layer; Part 1: Basic Data Transport Functions", ESTI TS 101 761-1 V1.3.1, p. 29-32 (Dec. 2001).

\* cited by examiner

MAINTAINING DELIVERY TRAFFIC INDICATION MESSAGE (DTIM) PERIODS ON A PER-WIRELESS CLIENT DEVICE BASIS

BACKGROUND OF THE INVENTION

The invention generally relates to wireless networks. In particular, embodiments of the invention relate to power saving for one or more client devices in a wireless network.

A wireless access point (AP) is a device that "connects" wireless devices together to create a wireless network. The wireless devices, also known as "client devices", communicate with each other or with other networks through the AP.

A client device may, or may not, be battery-powered. For example, a client device, such as a wireless-enabled laptop, a wireless-enabled cellphone, a wireless-enabled personal digital assistant (PDA), and the like, may sometimes be battery-powered, and at other times may receive power from an external source, such as a power outlet. Other client devices, such as a desktop computer, may receive power from an external source, such as a power outlet, and may not have the option to be battery-powered.

It may be beneficial to enhance the battery lifetime of battery-powered client devices.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
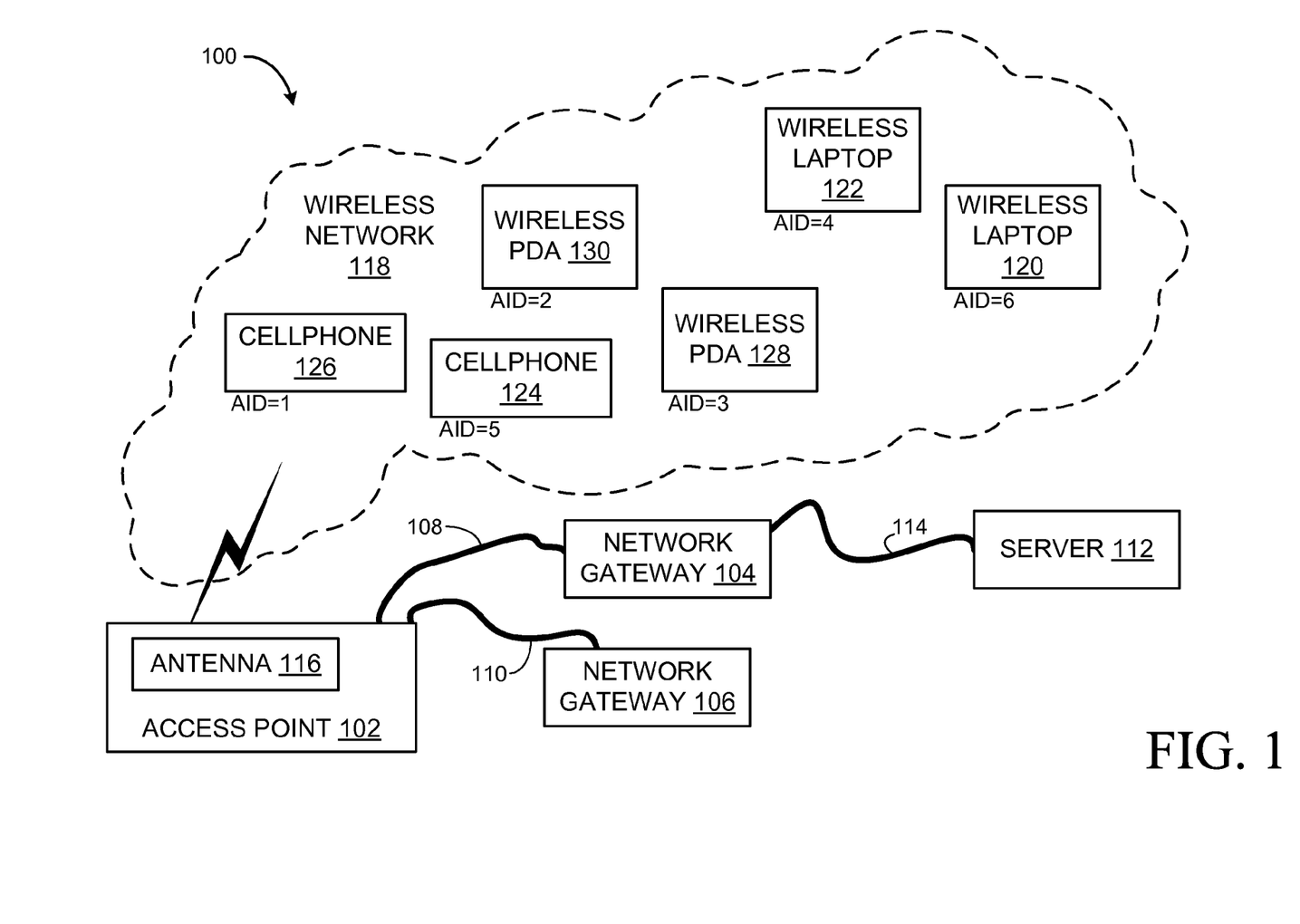
FIG. 1 is an illustration of an exemplary communications system, according to some embodiments of the invention.

FIG. 1 is an illustration of an exemplary communications system 100 according to embodiments of the invention. System 100 includes a wireless access point (AP) 102 and network gateways 104 and 106 coupled to AP 102 via wired connections 108 and 110, respectively. Network gateways 104 and 106, wired connections 108 and 110 may all be part of a "distribution system" for AP 102. Non-limiting examples for network gateways 104 and 106 are cable modems, Asymmetric Digital Subscriber Line (ADSL) modems, Asynchronous Transfer Mode (ATM) network gateways, dial-up modems, satellite modems, Integrated Services Digital Network (ISDN) gateways, T-carrier 1 (T1) modems, and the like. It is obvious that any other configuration of a distribution system for AP 102 is possible. System 100 also includes a desktop computer or server 112 coupled to gateway 104 via a wired connection 114.

AP 102 has at least one antenna 116 and is configurable to support at least one wireless network name, for example, at least one service set identifier (SSID). A non-exhaustive list of examples for antenna 116 includes a dipole antenna, a monopole antenna, a multilayer ceramic antenna, a planar inverted-F antenna, a loop antenna, a shot antenna, a dual antenna, an omnidirectional antenna and any other suitable antenna. AP 102 may include a router.

Exemplary communications system 100 includes wireless-enabled laptops 120 and 122, wireless-enabled cellphones 124 and 126 and wireless-enabled personal digital assistants (PDAs) 128 and 130. Each of wireless-enabled laptops 120 and 122, wireless-enabled cellphones 124 and 126 and wireless-enabled PDAs 128 and 130 is able to execute an initialization process to associate themselves in a wireless network with AP 102.

For example, wireless-enabled laptops 120 and 122, wireless-enabled cellphones 124 and 126 and wireless-enabled PDAs 128 and 130 may become associated with AP 102 over a wireless network 118. Wireless-enabled laptops 120 and 122, cellphones 124 and 126 and PDAs 128 and 130 are referred to as "client devices".

The client devices shown in FIG. 1 are just an example and other suitable client devices and groupings of client devices are also possible. A non-exhaustive list of examples for client devices includes work stations, server computers, notebook computers, laptop computers, desktop personal computers (PCs), personal digital assistant (PDA) computers, hand-held computers, wireless local area network (WLAN) stationary units, WLAN add-on cards, WLAN personal computer memory card international association (PCMCIA) cards, WLAN PC cards, WLAN switches, WLAN routers, WLAN servers, game consoles, digital cameras, digital video cameras, television sets, wireless Internet-Protocol (IP) phones and the like.

In this example, AP 102 and the client devices are all "802.11-enabled", which means that wireless communications therebetween are in accordance with one or more of the following standards defined by the Institute of Electrical and Electronic Engineers (IEEE) for Wireless LAN MAC and Physical layer (PHY) specifications:

| Standard | Published | Maximum Speed | Frequency | Modulation |
|---|---|---|---|---|
| 802.11 | 1997 | 2 Mbps | 2.4 GHz | Phase-Shift |
| 802.11a | 1999 | 54 Mbps | 5.0 GHz | Orthogonal Frequency Division Multiplexing |
| 802.11b | 1999 | 11 Mbps | 2.4 GHz | Complementary Code Keying |
| 802.11g | 2003 | 54 Mbps | 2.4 GHz | Orthogonal Frequency Division Multiplexing |

However, it will be obvious to those of ordinary skill in the art how to modify the following for other existing WLAN standards or future related standards, including 802.11n.

The 1999 edition of the 802.11 standard (as reaffirmed Jun. 12, 2003) distinguishes between infrastructure WLANs and ad-hoc WLANs. The following description is for infrastructure WLANs, involving the use of access points.

The 802.11 standard explains that access points transmit beacon frames at substantially regular time periods to announce the existence of and to synchronize wireless networks. The number of time units between target beacon transmission times is referred to as a "beacon interval". The format of beacon frames and their contents is explained in detail in the 802.11 standard. The beacon interval is included in each beacon frame.

Each beacon frame also includes a timestamp which is the value of a clock internal to the access point at the actual transmission time of the beacon. Due to use of carrier sense multiple access/collision detection (CSMA/CD) techniques, the actual transmission time may be later than the target beacon transmission time. Consequently, the timestamp field of the beacon frame is not filled until the actual transmission occurs. A client device receiving the beacon frame will update its internal clock according to the timestamp in the received beacon frame.

Each beacon frame also includes a Traffic Indication Map (TIM) that identifies client devices for which unicast traffic is pending and buffered in the access point. This information is encoded in a partial virtual bitmap. The TIM also includes an indication whether broadcast or multicast traffic is pending.

There are two different TIM types: TIM and delivery TIM (DTIM). A TIM includes a "DTIM count" field that indicates how many beacon frames (including the current frame) appear before the next DTIM. A DTIM count of zero indicates that the current TIM is a DTIM. The "DTIM period" field indicates the number of beacon intervals between successive DTIMs. Every DTIM period, a TIM of type "DTIM" is transmitted within a beacon, rather than an ordinary TIM. After a DTIM, the access point sends out the buffered broadcast or multicast traffic using normal frame transmission rules, before transmitting any unicast frames.

A client device may be in one of two different power states: "Awake"—the client device is fully powered; and "Doze"—the client device is unable to transmit or receive and consumes very low power. The manner in which a client device transitions between these two power states is determined by the power management mode of the client device. In "Active mode", the client device may receive frames at any time and is in the "Awake" state. In "Power Save mode", the client device listens to selected beacon frames (based upon the client device's "Listen Interval" parameter) and sends "Power Save poll (PS-poll)" frames to the access point if the TIM element in the most recent beacon frame indicates buffered unicast traffic for that client device.

In Power Save mode, a client device is in the Doze state and enters the Awake state to receive selected beacons, to receive broadcast and multicast transmissions following certain received beacons, to transmit, and to await responses to transmitted PS-poll frames or (for CF-pollable client devices) to receive contention-free transmissions of buffered traffic.

An access point maintains a Power Management status for each currently associated client device that indicates in which Power Management mode the client device is currently operating. Depending on the Power Management mode of the station, the access point temporarily buffers traffic destined for the client device. The access point transmits buffered unicast traffic to a client device in Power Save mode only in response to a PS-poll from that client device or during the contention-free (CF) period in the case of a CF-pollable client device in Power Save mode.

The "Listen Interval" parameter of a client device specifies the maximum number of beacon intervals that may pass before the client device awakens and listens for the next beacon frame. The client device informs the access point of its "Listen Interval" parameter during the association with the access point. The parameter may be determined, for example, by the desired power consumption/performance target of the client device.

The access point has an aging function to delete buffered traffic when it has been buffered for an excessive period of time. The aging function is based on the "Listen Interval" parameter, so that buffered traffic is retained for a period that is at least as long as a product of the Beacon Interval and the "Listen Interval" parameter of the client device for which the traffic is buffered.

The client device also has a Boolean parameter, entitled "Receive DTIMs", which is set when the client device informs the access point of a change in the power management mode of the client device. When the "Receive DTIMs" parameter is true, the client device awakens to receive all beacon frames that include a DTIM. When the parameter is false, the client device is not required to awaken for every beacon frame that includes a DTIM.

More detail about the power-management operation of the access point and client devices during the contention period and the contention-free period is given in the section of the 802.11 standard entitled "Power management in an infrastructure network".

The "Listen Interval" parameter of a particular client device affects the particular client device's power save behavior regarding unicast traffic, and the "DTIM period" of the access point and the "Receive DTIMs" parameter of the client devices affect the power save behavior of all client devices in the wireless network regarding broadcast and multicast traffic.

Client devices in a wireless network may have conflicting requirements for power consumption and communication throughput when in Power Save mode. Moreover, the need for power saving in a battery-powered client device may increase over time as the battery drains, overriding communication throughput considerations for the battery-powered client device.

Currently, an access point is able to store only a single DTIM period. Consequently, different client devices in Power Save mode will all wake up for the same beacon frames according to the single DTIM period. Currently, a network manager may need to balance the conflicting requirements for power consumption and communication throughput when in Power Save mode of client devices in a wireless network when configuring the DTIM period of an access point.

Currently, a client device that has its "Receive DTIMs" parameter set to true and is in Power Save mode will awaken according to the DTIM period of the access point with which it is associated in order to listen to DTIMs and determine whether to stay awake to receive broadcast or multicast traffic. That same client device will also awaken within a period determined by its "Listen Interval" parameter to listen to TIMs and determine whether to stay awake to issue a PS-poll frame for buffered unicast traffic.

Each client device has a unique hardware address, for example a medium access control (MAC) address, and is assigned an Internet Protocol (IP) address by a dynamic host configuration protocol (DHCP) server, which may be embedded in the access point. Alternatively, the IP address of a client device may be statically configured. In addition, an access point assigns an "association identifier (AID)" to client devices associated therewith and maintains a mapping of AIDs to MAC addresses. The access point identifies those client devices for which it has buffered unicast traffic by setting bits in the TIM's partial virtual bitmap that correspond to the appropriate AIDs. Moreover, the access point maintains an Address Resolution Protocol (ARP) table that contains a mapping of Internet Protocol (IP) addresses to MAC addresses.

A network gateway may receive from an external network one or more information frames to forward to a network device associated with a particular IP address. The network gateway may have to resolve the MAC address of the network device associated with the particular IP address in order to include the MAC address in the information frames and to send the information frames to the network device. The network gateway may generate an ARP request and send it to the various network devices, including the access point, which will treat it as broadcast traffic. The network device (or client device associated with the access point) having the particular IP address may respond to the ARP request with its MAC address.

According to an embodiment of the invention, AP 102 may be able to transmit DTIMs at different periods of beacon frames for different wireless client devices associated with AP 102. In other words, AP 102 may be able to maintain independent DTIM periods on a per wireless client device basis. A higher DTIM period may increase the potential savings in power consumption but may potentially reduce the communication throughput, and vice versa.

AP 102 may store one-to-one or one-to-many mappings of indications of different DTIM periods with AIDs of the client devices. For example, AP 102 may store the following mapping of DTIM periods and AIDs:

| DTIM Period | AID |
|---|---|
| 8 | 1 (cellphone 126) |
| 3 | 2 (PDA 130) |
| 8 | 3 (PDA 128) |
| 2 | 4 (laptop 122) |
| 16 | 5 (cellphone 124) |
| 1 | 6 (laptop 120) |

A client device in Power Save mode and having its "Receive DTIMs" parameter set to true will awaken from Power Save mode to listen to beacons at a period of beacon frames determined by the client device's DTIM period. As shown in the example above, different client devices associated with AP 102 may have different DTIM periods, and therefore a processor of AP 102 is able to transmit DTIMs at different DTIM periods for different client devices.

In the event that AP 102 has buffered broadcast data or buffered multicast data destined for some of the client devices that are in Power Save mode, AP 102 is to ensure that each of the client devices in Power Save mode has had an opportunity to listen to a DTIM indicating the presence of the buffered data.

Figure 2:
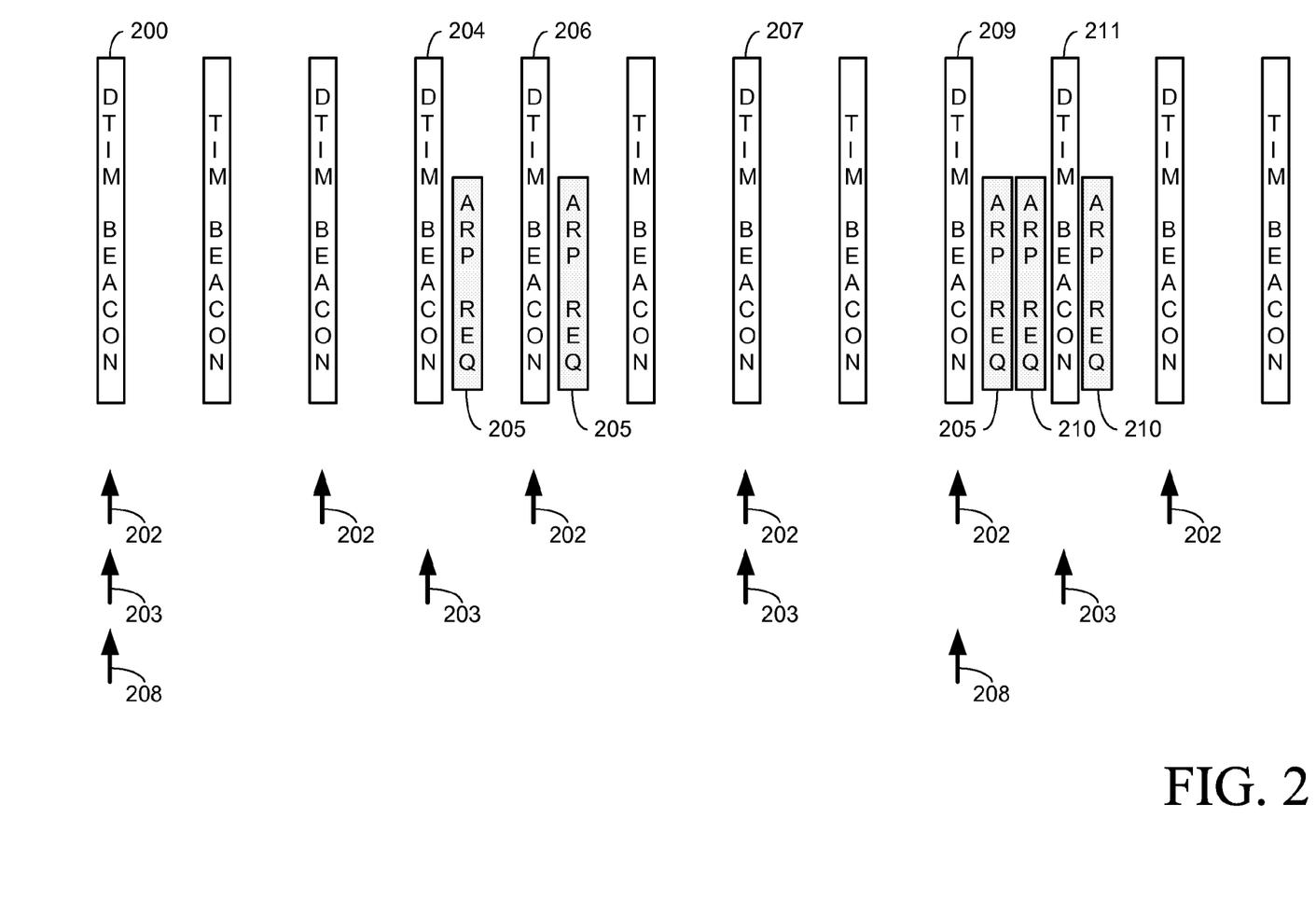
FIG. 2 is an illustration of an exemplary sequence of beacon frames, helpful in understanding some embodiments of the invention.

FIG. 2 is an illustration of an exemplary sequence of beacon frames transmitted by AP 102, according to some embodiments of the invention. Each beacon frame 200 includes a TIM, and in certain beacon frames, the TIM is a DTIM. For example, laptop 122, cellphone 126 and PDAs 128 and 130 may be in Power Save mode, with DTIM periods of 2, 8, 8 and 3, respectively. Laptop 122 will awaken from Power Save mode to listen to DTIMs in every other beacon frame, as indicated by arrows 202. Similarly, PDA 130 will awaken from Power Save mode to listen to DTIMs in every third beacon frame, as indicated by arrows 203. Similarly, cellphone 126 and PDA 128 will awaken from Power Save mode to listen to DTIMs in every eighth beacon frame, as indicated by arrows 208.

For example, if AP 102 receives an ARP request 205 prior to beacon frame 204, then since at least one of the client devices associated with AP 102 is in Power Save mode, AP 102 will buffer the ARP request.

AP 102 will include in the DTIM of beacon frame 204 an indication that broadcast data is buffered, and will transmit ARP request 205 following beacon frame 204. PDA 130 will awaken to listen to the DTIM of beacon frame 204, will identify that broadcast data is buffered, and will remain awake to receive ARP request 205 following beacon frame 204. Laptop 120, which is in the Awake state, will listen to the DTIM of beacon frame 204, will identify that broadcast is buffered, and will receive ARP request 205 following beacon frame 204.

AP 102 will also include in the DTIM of beacon frame 206 an indication that broadcast data is buffered, and will transmit ARP request 205 following beacon frame 206. Laptop 122 will awaken to listen to the DTIM of beacon frame 206, will identify that broadcast data is buffered, and will remain awake to receive ARP request 205 following beacon frame 206.

The DTIM of beacon frame 207 will not include an indication that broadcast data is buffered, since it will be listened to only by laptop 122 and PDA 130, both of which have already had an opportunity to listen to a DTIM indicating the presence of ARP request 205.

To continue the example, if AP 102 receives an ARP request 210 prior to beacon frame 209, AP 102 will buffer ARP request 210 for those client devices in Power Save mode, namely laptop 122, cellphone 126 and PDAs 128 and 130.

AP 102 will include in the DTIM of beacon frame 209 an indication that broadcast data is buffered, and will transmit ARP requests 205 and 210 following beacon frame 209. Laptop 122, cellphone 126 and PDA 128 will awaken to listen to the DTIM of beacon frame 209, will identify that broadcast data is buffered, and will remain awake to receive ARP requests 205 and 210 following beacon frame 209.

Since each of the client devices in Power Save mode has had an opportunity to listen to a DTIM indicating the presence of buffered ARP request 205 and to receive ARP request 205 thereafter, AP 102 may discard ARP request 205 after transmitting ARP request 205 following beacon frame 209.

AP 102 will also include in the DTIM of beacon frame 211 an indication that broadcast data is buffered, and will transmit ARP request 210 following beacon frame 211. PDA 130 will awaken to listen to the DTIM of beacon frame 211, will identify that broadcast data is buffered, and will remain awake to receive ARP request 210 following beacon frame 211.

Since each of the client devices in Power Save mode has had an opportunity to listen to a DTIM indicating the presence of buffered ARP request 210 and to receive ARP request 210 thereafter, AP 102 may discard ARP request 210 after transmitting ARP request 210 following beacon frame 211.

Figure 3:
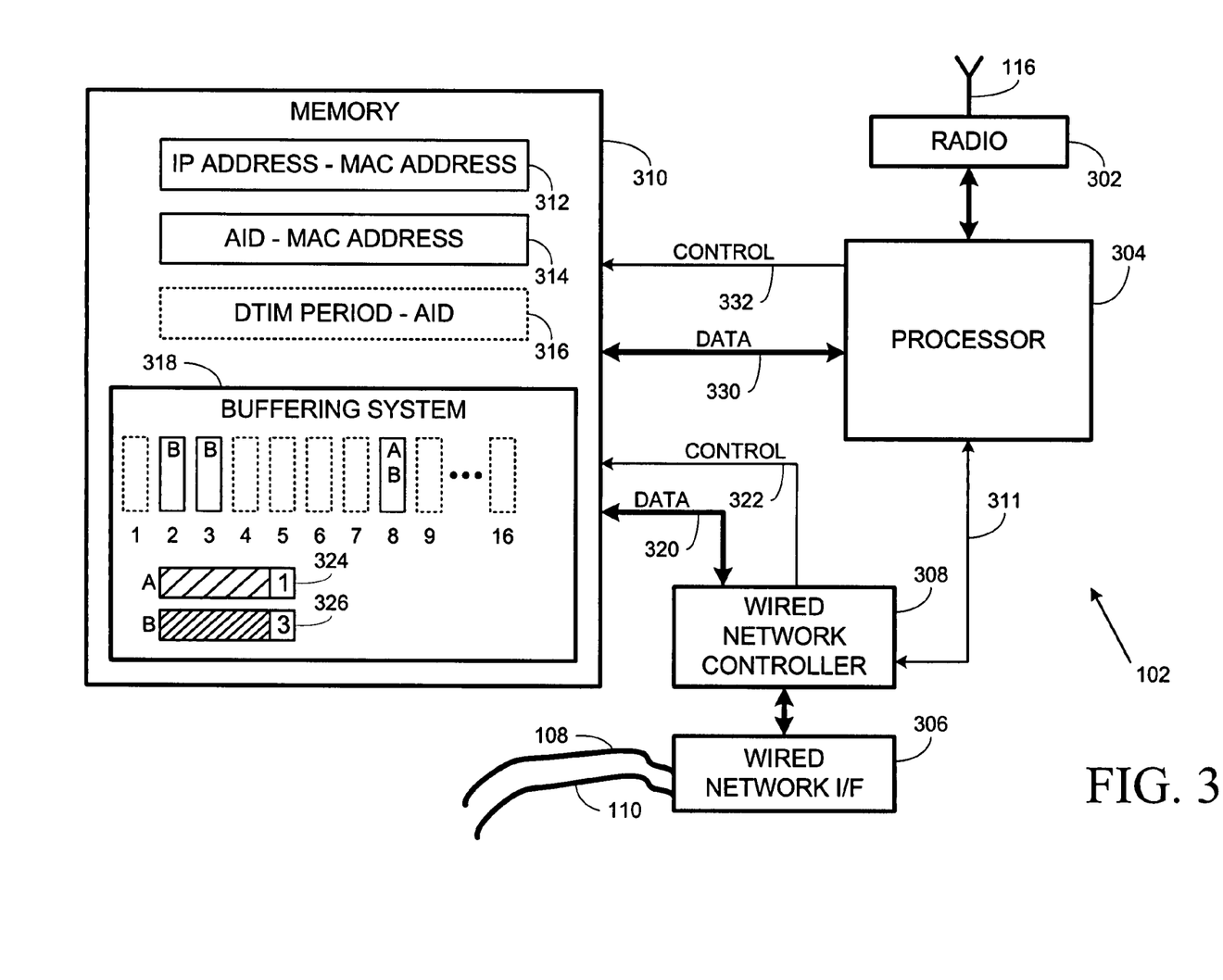
FIG. 3 is a block diagram of an exemplary access point, according to an embodiment of the invention.

FIG. 3 is a block diagram of an exemplary access point, according to some embodiments of the invention. AP 102 includes at least one antenna 116 coupled to a radio 302, which in turn is coupled to a processor 304 having baseband functionality. A non-exhaustive list of examples for processor 304 includes a central processing unit (CPU), a microcontroller, a digital signal processor (DSP), a reduced instruction set computer (RISC), a complex instruction set computer (CISC) and the like. Furthermore, processor 304 may be part of an application specific integrated circuit (ASIC) or may be a part of an application specific standard product (ASSP).

AP 102 also includes a wired network interface 306 coupled to a wired network controller 308. The wired network(s) may be, for example, Ethernet network(s), token rings, Universal Serial Bus (USB), wired network(s) according to the IEEE 1394-1995, IEEE 1394a-2000, and IEEE 1394b standards (commonly known as "FireWire"), or any combination thereof. Wired network interface 306 is able to use wired connections 108 and 110.

Radio 302 and processor 304 may be part of the same integrated circuit or in separate integrated circuits. Similarly, processor 304 and wired network controller 308 may be part of the same integrated circuit or in separate integrated circuits.

AP 102 also includes a memory 310, which may be fixed in or removable from AP 102. Memory 310 may be coupled to processor 304 or partly embedded in processor 304. A non-exhaustive list of examples for memory 310 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Processor 304 and wired network controller 308 may be coupled by signals 311 to coordinate their activities, for example access to memory 310.

Memory 310 may store mappings 312 of MAC addresses of client devices associated with AP 102 to respective IP addresses, and mappings 314 of MAC addresses of client devices associated with AP 102 to respective AIDs. Memory 310 may also store one-to-one or one-to-many mappings 316 of indications of different DTIM periods with AIDs of the client devices. It should be understood that this is merely an example, and that other methods for mapping AIDs, MAC addresses and IP addresses are also possible. Alternatively, any or all of these mappings may be stored internally in processor 304.

Memory 310 may also include a buffering system 318 to store incoming traffic destined for client devices. For example, data 320 of incoming traffic may be transferred to buffering system 318 under control signals 322 of wired network controller 308.

In one embodiment, AP 102 may maintain in buffering system 318 lists for each "active" DTIM period, i.e., for each DTIM period that is currently applicable to one or more client devices in Power Save mode. For example, as AP 102 receives ARP request 205 prior to beacon frame 204 (FIG. 2), AP 102 may allocate buffer A to store ARP request 205. AP 102 may set a counter 324 associated with buffer A to the value 3, which is the total number of DTIM periods that are currently "active". For example, FIG. 3 shows lists maintained for DTIM periods 2, 3 and 8. AP 102 will include a pointer to buffer A (or any other suitable indication of buffer A) in the lists for DTIM periods 2, 3 and 8.

Once the indication of buffered broadcast data has been included in the DTIM of beacon frame 204 (which will be listened to by client devices having a DTIM period of 3) and ARP request 205 has been transmitted following beacon frame 204, the pointer to buffer A is removed from the list for DTIM period 3 and counter 324 is decremented by 1. Once the indication of buffered broadcast data has been included in the DTIM of beacon frame 206 (which will be listened to by client devices having a DTIM period of 2) and ARP request 205 has been transmitted following beacon frame 206, the pointer to buffer A is removed from the list for DTIM period 2 and counter 324 is decremented by 1. Once the indication of buffered broadcast data has been included in the DTIM of beacon frame 209 (which will be listened to by client devices having a DTIM period of 8) and ARP request 205 has been transmitted following beacon frame 209, the pointer to buffer A is removed from the list for DTIM period 8 and counter 324 is decremented by 1. Once counter 324 is zero, AP 102 is free to deallocate buffer A and discard ARP request 205.

Similarly, as AP 102 receives ARP request 210 prior to beacon frame 209, AP 102 may allocate buffer B to store ARP request 210. AP 102 may set a counter 326 associated with buffer B to the value 3. AP 102 will include a pointer to buffer B in the lists for DTIM periods 2, 3 and 8.

Once the indication of buffered broadcast data has been included in the DTIM of beacon frame 209 (which will be listened to by client devices having a DTIM period of 2 and client devices having a DTIM period of 8) and ARP request 210 has been transmitted following beacon frame 209, the pointer to buffer B is removed from the list for DTIM period 2 and from the list for DTIM period 8, and counter 326 is decremented by 2. Once the indication of buffered broadcast data has been included in the DTIM of beacon frame 211 (which will be listened to by client devices having a DTIM period of 3) and ARP request 210 has been transmitted following beacon frame 211, the pointer to buffer B is removed from the list for DTIM period 3 and counter 326 is decremented by 1. Once counter 326 is zero, AP 102 is free to deallocate buffer B and discard ARP request 210.

FIG. 3 shows the lists in buffering system 318 in the state after ARP request 210 has been received by AP 102, but before beacon frame 209.

In another embodiment, AP 102 may maintain in buffering system 318 lists for each client device in Power Save mode. Similar to the "list-per-DTIM-period" embodiment above, AP 102 may allocate a buffer upon receipt of broadcast or multicast data and may include a pointer to the allocated buffer (or any other suitable indication of the allocated buffer) in the lists for the client devices in Power Save mode. Each such allocated buffer is associated with a counter that is set to the total number of client devices in Power Save mode that are destined to receive the broadcast or multicast data. Once a DTIM indicating the presence of the buffered data has been included in a beacon frame, and the buffered data has been transmitted following the beacon frame, AP 102 removes the pointer from the lists of client devices that were supposed to awaken to listen to that DTIM and decreases the counter by the number of client devices that were supposed to awaken to listen to that DTIM. Once the counter is zero, AP 102 is free to deallocate the allocated buffer and discard the buffered data.

In any of these embodiments, processor 304 may handle the transmission of DTIMs at different DTIM periods for different wireless client devices by accessing buffering system 318 and the AID-DTIM period mapping through data signals 330 and control signals 332.

Figure 4:
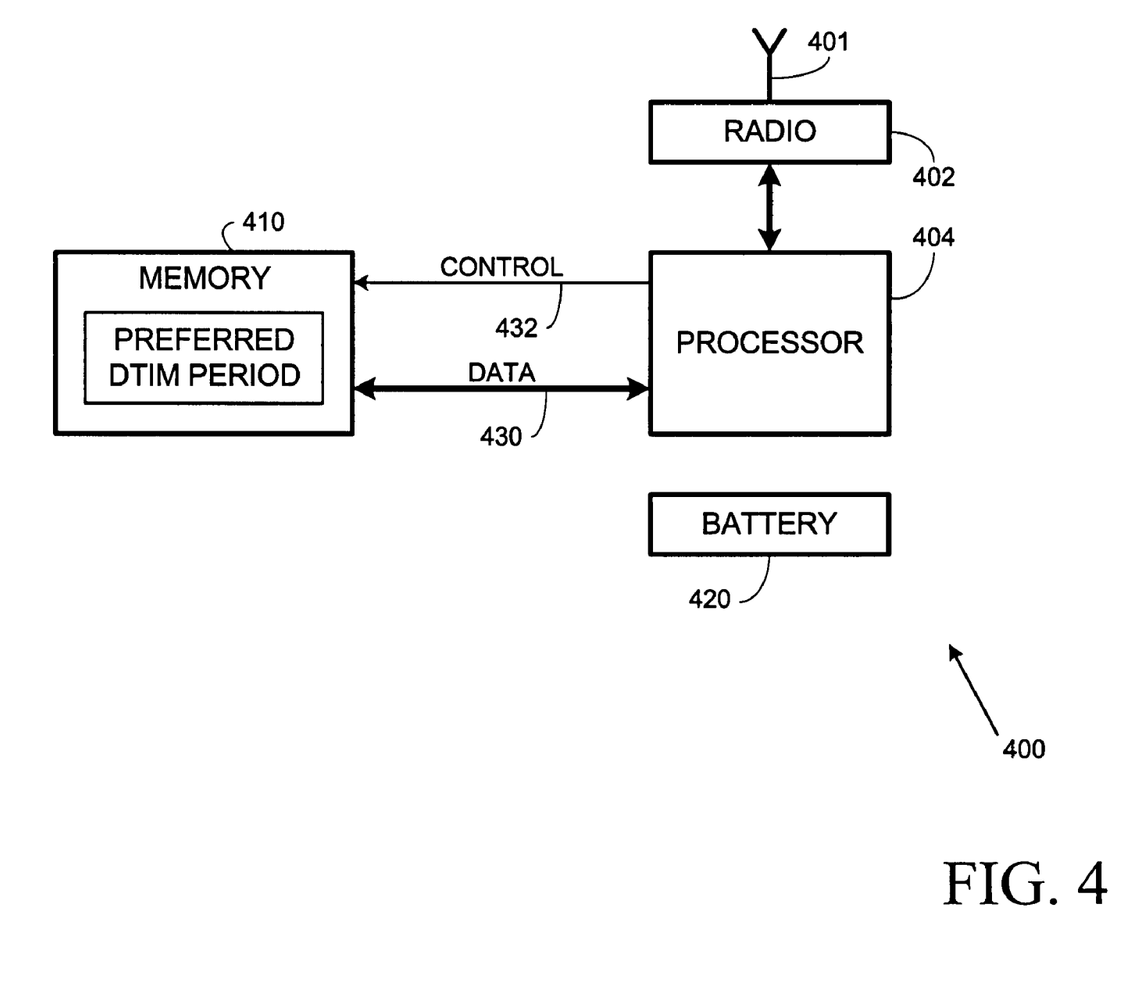
FIG. 4 is a block diagram of an exemplary wireless client device, according to an embodiment of the invention.

FIG. 4 is a block diagram of an exemplary client device, according to some embodiments of the invention. A wireless client device 400 includes at least one antenna 401 coupled to a radio 402, which in turn is coupled to a processor 404 having baseband functionality. A non-exhaustive list of examples for processor 404 includes a central processing unit (CPU), a digital signal processor (DSP), a reduced instruction set computer (RISC), a complex instruction set computer (CISC) and the like. Furthermore, processor 404 may be part of an application specific integrated circuit (ASIC) or may be a part of an application specific standard product (ASSP). Radio 402 and processor 404 may be part of the same integrated circuit in separate integrated circuits.

Client device 400 also includes a memory 410, which may be fixed in or removable from client device 400. Memory 410 may be coupled to processor 404 or partly embedded in processor 404. A non-exhaustive list of examples for memory 410 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Processor 404 may access data stored in memory 410 through data signals 430 and control signals 432. Memory 410 may store an indication of a preferred DTIM period to apply to client device 400 when in Power Save mode. Memory 410 may store a default hard-coded value for the preferred DTIM period. The preferred DTIM period may be configurable by a user of client device 400. Client device 400 may negotiate its DTIM period with AP 102 only once, or may negotiate its DTIM period with AP 102 on the fly as conditions change. For example, processor 404 may adjust the preferred DTIM period of client device 400 according to predefined considerations. A non-exhaustive list of examples for such considerations includes:

a) a charge level of a battery 420 to power the client device (for example, increasing the preferred DTIM period as the charge level drops):

b) an expected usage model for the client device; and c) network parameters (for example, does the gateway remember the IP address—MAC address mapping after receiving a response to an ARP request?).

Client device 400 is to inform AP 102 of its preferred DTIM period. Alternatively, client 400 is to transmit a request to AP 102, where the request is a request to listen to DTIMs from AP 102 at the preferred DTIM period when in Power Save mode. The request may be generated by processor 404 and transmitted by radio 402. Upon receipt of this request, AP 102 may accept the preferred DTIM period and store the mapping of the preferred DTIM period to the AID of client device 400, or AP 102 may respond with an indication of a different, acceptable DTIM period that client device 400 is to use when in Power Save mode. This latter response may be suitable when AP 102 is unable to support the requested DTIM period due to memory constraints or other limitations.

Once a DTIM period has been negotiated between a client device and an access point, the access point may delay implementation of the newly negotiated period until after the longest already-negotiated DTIM period has passed.

For example, client device 400 may issue a new management frame announcing its preferred DTIM period. In response, AP 102 may respond with a number. If the number is greater than or equal to 0, then the number represents when (in beacon intervals) the new DTIM period will be implemented by AP 102. If the number is negative, that indicates to the client device that AP 102 rejects the proposed DTIM period and the client device will have to send a new request.

In order to support legacy client devices and clients not in Power Save mode, AP 102 may have a default DTIM period, say DTIM period 1, that is transmitted in the "DTIM period" field of the TIM element of each beacon frame. Buffered broadcast or multicast data may be transmitted by AP 102 following a DTIM identifying the presence of such buffered data.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An access point comprising:

an antenna;

a radio coupled to said antenna to transmit beacon frames on a channel;

a memory to store concurrently a first IEEE 802.11 delivery traffic indication message 'DTIM' period value for a first wireless client device and a second IEEE 802.11 DTIM period value, which differs from said first IEEE 802.11 DTIM period value, for a second wireless client device, where concurrently said first wireless client device is associated with said access point over a wireless network having a network name on said channel and said second wireless client device is associated with said access point over said wireless network on said channel; and a processor coupled to said radio and to said memory, said processor able to include DTIMs in said beacon frames based on said first IEEE 802.11 DTIM period value and to include DTIMs in said beacon frames based on said second IEEE 802.11 DTIM period value.

2. The access point of claim 1, wherein said access point is able to store one-to-one or one-to-many mappings of indications of said different periods with association identifiers of said wireless client devices.

3. The access point of claim 1, wherein said access point is able to receive a request from a particular one of said wireless client devices, and said request is a request to listen to delivery traffic indication messages from said access point at a preferred period of beacon frames when said particular one of said wireless client devices is in power-save mode.

4. The access point of claim 1, wherein said access point uses an IEEE 802.11 wireless local area network standard.

5. The access point of claim 1, wherein in the event that said first wireless client device and said second wireless client device are in a power-save mode, said memory is able to buffer data that is destined for said first wireless client device and said second wireless client device, and said processor is able to cause the radio to transmit said buffered data following transmission in said beacon signal of a beacon frame that, based on said first IEEE 802.11 DTIM period value, has an IEEE 802.11 DTIM to indicate the presence of said buffered data, and to cause the radio to transmit said buffered data following transmission in said beacon signal of another beacon frame that, based on said second IEEE 802.11 DTIM period value, has an IEEE 802.11 DTIM to indicate the presence of said buffered data.

6. The access point of claim 5, wherein said data is broadcast data.

7. The access point of claim 5, wherein said data is multicast data.

8. The access point of claim 5, wherein said memory is to refrain from discarding said buffered data until said first wireless client device and said second wireless device have each had an opportunity to listen to an IEEE 802.11 DTIM indicating the presence of said buffered data and have each had an opportunity to receive said buffered data transmitted by said access point following said IEEE 802.11 DTIM.

9. The access point of claim 8, wherein said data is broadcast data.

10. The access point of claim 8, wherein said data is multicast data.

11. The access point of claim 1, wherein said network name is a service set identifier (SSID).

12. A method in an access point, the method comprising:
at regular times defined by a beacon interval, transmitting on a channel beacon frames in a beacon signal;
concurrently maintaining a first IEEE 802.11 delivery traffic indication message 'DTIM' period value for a first wireless client device and a second IEEE 802.11 DTIM period value, which differs from said first IEEE 802.11 DTIM period value, for a second wireless client device;
including DTIMs in said beacon frames based on said first IEEE 802.11 DTIM period value; and
including DTIMs in said beacon frames based on said second IEEE 802.11 DTIM period value,
wherein concurrently said first wireless client device is associated with said access point over a wireless network having a network name on said channel and said second wireless client device is associated with said access point over said wireless network on said channel.

13. The method of claim 12, further comprising:
receiving said first IEEE 802.11 DTIM period value from said first wireless client device.

14. The method of claim 13, further comprising:
adjusting said received first IEEE 802.11 DTIM period value; and
transmitting said adjusted first IEEE 802.11 DTIM period value to said first wireless client device.

15. The method of claim 14, wherein said adjusted first IEEE 802.11 DTIM period value and said second IEEE 802.11 DTIM period value are different values.

16. The method of claim 12, further comprising:
if said first wireless client device and said second wireless client device are in a power-save mode:
buffering data that is destined for said first wireless client device and said second wireless client device;
transmitting said buffered data following transmission in said beacon signal of a beacon frame that, based on said first IEEE 802.11 DTIM period value, has an IEEE 802.11 DTIM to indicate the presence of said buffered data; and
transmitting said buffered data following transmission in said beacon signal of another beacon frame that, based on said second IEEE 802.11 DTIM period value, has an IEEE 802.11 DTIM to indicate the presence of said buffered data.

17. The method of claim 16, wherein said data is broadcast data.

18. The method of claim 16, wherein said data is multicast data.

19. The method of claim 16, further comprising:
refraining from discarding said buffered data until said first wireless client device and said second wireless client device have each had an opportunity to listen to an IEEE 802.11 DTIM indicating the presence of said buffered data and have each had an opportunity to receive said buffered data transmitted by said access point following said IEEE 802.11 DTIM.

20. The method of claim 19, wherein said data is broadcast data.

21. The method of claim 19, wherein said data is multicast data.

22. The method of claim 12, wherein said network name is a service set identifier (SSID).

* * * * *